United States Patent [19]

Suzuki et al.

[11] Patent Number: 4,731,311

[45] Date of Patent: Mar. 15, 1988

[54] ELECTRICALLY CONDUCTIVE MATERIAL AND SECONDARY BATTERY USING THE ELECTRICALLY CONDUCTIVE MATERIAL

[75] Inventors: Tetsumi Suzuki, Isehara; Kazumi Hasegawa, Yokohama; Nobuhiro Furukawa; Koji Nishio, both of Hirakata; Masahisa Fujimoto, Osaka; Noriyuki Yoshinaga, Hirakata, all of Japan

[73] Assignees: Sanyo Electric Co., Ltd., Osaka; Mitsubishi Chemical Industries Limited, Tokyo, both of Japan

[21] Appl. No.: 917,051

[22] Filed: Oct. 9, 1986

[30] Foreign Application Priority Data

Oct. 9, 1985 [JP] Japan .............................. 60-225761
Nov. 20, 1985 [JP] Japan .............................. 60-260923
Apr. 30, 1986 [JP] Japan .............................. 61-99564
May 14, 1986 [JP] Japan .............................. 61-110372
May 14, 1986 [JP] Japan .............................. 61-110373

[51] Int. Cl.⁴ .............................................. H01M 4/60
[52] U.S. Cl. ..................................... 429/213; 252/500
[58] Field of Search ........................ 429/213; 252/500

[56] References Cited

U.S. PATENT DOCUMENTS 4,547,439 10/1985 Genies ................................ 429/213
4,567,250 1/1986 Naarmann et al. ................ 252/500
4,629,540 12/1986 Geniees et al. ..................... 429/213
4,652,396 3/1987 Wagener ............................ 252/500

Primary Examiner—Donald L. Walton
Attorney, Agent, or Firm—Wenderoth, Lind & Ponack

[57] ABSTRACT

An electrically conductive material containing no substantial amount of water and prepared by polymerizing, in the presence of an oxidizing agent, a compound having conjugated double bonds on a base material in a gas phase. The base material has spaces capable of retaining the oxidizing agent. The electrically conductive material is used for at least one electrode of a secondary battery.

17 Claims, 13 Drawing Figures

ELECTRICALLY CONDUCTIVE MATERIAL AND SECONDARY BATTERY USING THE ELECTRICALLY CONDUCTIVE MATERIAL

BACKGROUND OF THE INVENTION

The present invention relates to an electrically conductive material comprising a polymer of a compound having conjugated double bonds, which is provided on a specific base material, and to a secondary battery using this type of electrically conductive material.

It is known that polymers having conjugated double bonds in the main chain, such as polyacetylene, poly-p-phenylene, polythienylene, polypyrrole, polyaniline, and poly-p-phenylene-vinylene, are remarkably improved in electric conductivity when they are treated with a P- or N-type doping agent such as arsenic pentafluoride, antimony pentafluoride, iodine, bromine, sulfur trioxide, n-butyllithium, or sodium naphthalene, whereby they are changed from an insulator to a semiconductor or a conductor. These electrically conductive materials (so-called "electrically conductive polymers") are obtained in the form of powder, grain, bulk, or film, which is used either as such or after molding thereof in accordance with the purpose of use thereof. They are now under investigation as to the application thereof to a wide variety of fields involving not only functional elements such as an antistatic material, an electromagnetic wave shielding material, a photoelectric conversion element, an optical memory (holographic memory), and various sensors but also a display element (electrochromism), a switch, various hybrid materials (transparent conductive film, and the like), various terminal equipment, and a secondary battery.

However, this type of electrically conductive polymer is generally poor in moldability and processability. Particularly in order to obtain a film form of an electrically conductive polymer, a special process must be adopted. Today, known films of such electrically conductive polymers include a polyacetylene film which is generally prepared by blowing an acetylene gas against a glass wall coated with a polymerization catalyst to form a film and peeling the film from the glass wall, and polypyrrole and polythienylene films which are prepared by forming a film on an electrolysis electrode according to an electrochemical oxidation reaction (electrolytic oxidation polymerization) and peeling the film from the electrode.

Among the above-mentioned conventional electrically conductive polymer films, the polyacetylene film disadvantageously is so unstable in air as to undergo progressive oxidative deterioration, and has a low mechanical strenght, while the polypyrrole and polythienylene films and the like obtained by the above-mentioned electrolytic oxidation polymerization disadvantageously have their film size restricted by the size of the electrolysis electrode, and involve complicated steps and a high cost.

Further, Journal of Electronic Materials, Vol. 13, No. 1, pp. 211–230 (1984) revealed an electrically conductive material prepared by immersing a filter paper in 0.01M aqueous HCl containing $FeCl_3.6H_2O$, bringing the filter paper into contact with pyrrole vapor or immersing the filter paper in a pyrrole solution to effect gas-phase or solution polymerization of the pyrrole on the filter paper. It further revealed an electrically conductive material prepared by bringing a pyrrole vapor into contact with a filter paper after immersion thereof in a solution of $FeCl_3.6H_2O$—$C_2H_5OH$ to effect gas-phase polymerization of the pyrrole into polypyrrole on the filter paper.

However, the former, namely the electrically conductive material prepared by the method involving immersion of a filter paper in 0.01M aqueous HCl containing $FeCl_3.6H_2O$, contains water and disadvantageously undergoes drastic reduction in electric conductivity when dried. Thus, this electrically conductive material can be used only in a wet state (hydrous state). This presents a problem such that this material cannot be used, for example, as the electrode material of a secondary battery of the non-aqueous electrolytic solution system in reality. Further, in this electrically conductive material, iron compounds used for the polypyrrole formation remains as an impurity without being removed. The presence of this impurity presents problems of providing low performance and limited use and application of the electrically conductive material when it remains as it is due to its low electrical conductivity. On the other hand, the latter, namely the electrically conductive material prepared by the method involving immersion in a solution of $FeCl_3.6H_2O$—$C_2H_5OH$, has an electric conductivity as low as 1/1000 of that of the above-mentioned material prepared by the method involving immersion in 0.01M aqueous HCl containing $FeCl_3.6H_2O$, thus presenting a problem of being notably poor in performance as the electrically conductive material.

On the other hand, there has recently been proposed a secondary battery prepared by using an electrically conductive polymer as mentioned above as the electrode material.

Although such an electrically conductive polymer usually has a slight electric conductivity as described above, the electric conductivity thereof can be dramatically increased by doping since it can be doped with a dopant such as any one of various anions and cations, or can be undoped. In constituting a secondary battery with such an electrically conductive polymer as the electrode material, an electrically conductive polymer capable of being doped with anions is used as the anode material, and/or an electrically conductive material capable of being doped with cations is used as the cathode material, while a solution containing a dopant as mentioned above is used as the electrolytic solution. Thus, there can be produced a secondary battery capable of charging and discharging via electrochemically reversible doping and undoping.

Known electrically conductive polymers of the kind as described above include the aforementioned polymers having conjugated double bonds in the main chain, such as polyacetylene, poly-p-phenylene, polypyrrole, polythienylene, polyaniline, and poly-p-phenylene-vinylene. In an instance of polyacetylene, it is used as the electrode material for at least one of the anode and the cathode, while anions such as $BF_4^-$, $ClO_4^-$, $SbF_6^-$ or $PF_6^-$, or cations such as $Li^+$, $Na^+$ or $R_4N^+$ (wherein R represents an alkyl group) are employed to constitute an electrochemically reversible system capable of doping and undoping.

These electrically conductive polymers are obtained in the form of powder, grain, bulk, or film. In the case of using a powdery, grainy, or bulky form of an electrically conductive polymer as the electrode material in constituting a secondary battery with a non-aqueous electrolytic solution or a solid electrolyte, there is needed a step of press-molding the polymer into an electrode either as such or after addition of an adequate electrically conductive material for improving the electric conductivity and/or a thermoplastic resin for improving the mechanical strength of the resulting electrode. In this respect, the use of a film form of an electrically conductive polymer provides, for example, such a characteristic feature that the film can be only punched with a predetermined size into an electrode to considerably facilitate the electrode production.

Known examples of such an electrically conductive polymer film include not only polyacetylene, polypyrrole, and polythienylene films as described before, but also composite electrically conductive films obtained by coating a base material such as a PET film with a solution containing an oxidizing agent and a polymer binder and bringing the resulting base material into contact with a vapor of pyrrole, aniline, or the like to form a layer of an electrically conductive polymer film on the base material.

However, in the case of using a conventional electrically conductive polymer film as mentioned above as a battery electrode material constituting a secondary battery, a polyacetylene film quite disadvantageously undergoes polymer deterioration due to slight amounts of oxygen and water present in the battery, leading to a poor performance of the electrode, and causes, for example, a rapid increase in charging voltage and a decrease in charging and discharging efficiency during cycles, leading to a shortened cycling life span. Further, there have arisen problems such that the film is liable to be oxidized with oxygen contained in a working atmosphere, leading to a difficult and complicated production of electrodes, and that the preservability of electrodes is poor due to grave deterioration of the materail by oxidation.

In the case of using a polythienylene or polypyrrole film prepared by the electrochemical oxidation polymerization reaction, not only is the size of the film restricted by the size of the electrolysis electrode, but also a complicated production process and a need for a special production apparatus are involved, thus leading to a high battery production cost. Further, since a difficulty is encountered in obtaining a thick and uniform film, combined use of this film as a battery electrode with a collector involves such problems that the contact of the film with the collector may become poor during charging and discharging cycles, and that the battery reaction may occur concentrately in a portion of the electrode, thus causing deterioration in battery performance.

In the case of using a composite electrically conductive film as mentioned above, since the polymer binder is used in order to keep the oxidizing agent on the base material, an electrically conductive polymer obtained by the polymerization reaction is in the form of a compositie electric conductive made of a mixture of a polymer of pyrrole or aniline with the polymer binder. This decreases the concentration of the polymer of pyrrole or aniline having an electric conductivity in the electrically conductive polymer. Thus, when it is used as an electrode material, a problem of poor performance arises due to the disadvantageous reduction in the effective polymer concentration since the same performance as that in the case of using, for example, a conventional electrically conductive polymer film as mentioned above cannot be attained even is desired.

SUMMARY OF THE INVENTION

An object of the present invention is to provide an electrically conductive material comprising a specific base material and, polymerized thereon, a compound having conjugated double bonds, which does not involve the above-mentioned problems, which is stable in air, can be readily produced, and has a high electric conductivity, and which can be rendered electrically conductive, for example, in an arbitrary direction in an arbitrary portion.

Another object of the present invention is to provide an electrically conductive material comprising a specific base material and, polymerized thereon, a compound having conjugated double bonds, which can be readily rendered electrically conductive, for example, in one surface thereof.

A still further object of the present invention is to provide a secondary battery prepared by using an electrically conductive material of the kind as described above, which greatly facilitates the control of an electrode preparation atmosphere since the control must not be so severe as compared with that in the case where a polyacetylene film is used as the electrode material, and which uses an electrode not only improved in itself in preservability but also causing neither denaturing nor decomposition even when exposed to oxygen and water present inside the battery or excessive charging to avoid a rapid increase in voltage in the course of charging, leading to improvements in charging efficiency and cycling life span.

A further object of the present invention is to provide a secondary battery of the kind as described above, the cycling life span of which is improved by providing better contact of an electrode with a collector.

A still further object of the present invention is to provide a secondary battery of the kind as described above, the charging and discharging characteristics of which is improved by improving the liquid containing capacity of an electrode itself.

The above-mentioned objects have been attained by the electrically conductive material of the present invention containing no substantial amount of water which is prepared by polymerizing in the presence of an oxidizing agent a compound having conjugated double bonds on a base material having spaces capable of retaining the oxidizing agent in a gas phase to form a polymer of the above-mentioned compound on the base material.

The above-mentioned oxidizing agent is a compound having an activity of polymerizing a monomer compound having conjugated double bonds. The oxidizing agent may be used in the form of a single compound as described above or in combination of two or more kinds of such compounds. Usually used in a metallic salt containing a residue group of a strong acid, a halogen or a cyano group, a peroxide, a nitrogen oxide, or the like. Specific examples of such compounds include $Fe(ClO_4)_3$, $Fe(BF_4)_3$, $Fe_2(SiF_6)_3$, $Cu(ClO_4)_2$, $Cu(BF_4)_2$, $CuSiF_6$, $FeCl_3$, $CuCl_2$, $K_3[Fe(CN)_6]$, $RuCl_3$, $MoCl_5$, $WCl_6$. Those compounds can also be used as they have water of crystallization or as they are obtained in the form of a solution. In addition, other compounds such as $(NH_4)_2S_2O_8$, $K_2S_2O_8$, $Na_2S_2O_8$, $NaBO_3$, $H_2O_2$, $NOBF_4$, $NO_2BF_4$, $NO_2PF_6$, $NOClO_4$, $NOAsF_6$, and $NOPF_6$ can be used.

A material having spaces capable of retaining the above-mentioned oxidizing agent is used as the base material. Such spaces are satisfactory if only their size is enough to retain the oxidizing agent at least in the form of molecules or aggregates. It is not preferred that the spaces be too small to retain the oxidizing agent in the form of molecules or too large to retain the oxidizing agent in the form of aggregates. These spaces are distributed in the form of micropores or voids having any of various shapes on or inside the base material. In the case of micropores, the average size thereof is specifically 0.001 to 100 μm, preferably 0.005 to 50 μm. It has been known that the depth of the micropores is 0.001 μm or deeper, preferably 0.005 μm or deeper.

The form of the base material having the above-mentioned characteristics is specifically a porous material [powder, molding (plate molding or the like), sheet, film, filament], woven fabric, non-woven fabric, a fibrous material by more than two filaments, or the like.

The base material to be used may be either organic or inorganic. Usable organic base materials include materials of polyolefin, polyvinyl halide, polyfluorocarbon, polyester, polyamide, polyimide, polyacrylic, polycarbonate, as well as their copolymer and mixture types. Usable inorganic base materials include materials of carbon, metal, alloy, metal oxide, metal carbide, metal nitride, and their mixture types. A base material made of a mixture of organic and inorganic base materials may also be used.

Specific examples of such organic base materials include resins which contain no hydroxyl group, which is referred to as "hydrophobic resins" hereinafter, such as polyethylene, polypropylene, ethylene-propylene copolymers, polyvinyl chloride, polyvinylidene chloride, polyvinyl fluoride, polytetrafluoroethylene, polyethylene terephthalate, polybutylene terephthalate, polystyrene, polyamides, polyimides, polyamide-imides, ethylene-vinyl acetate copolymers, polyacrylonitrile, polymethacrylonitrile, polymethyl methacrylate, polybutyl methacrylate, polystyrene-acrylonitrile, and polycarbonate. Specific examples of such inorganic base materials include such materials as active carbon, carbon black, graphite, chromium, titanium, nickel, gold, platinum, tantalum, copper, silver, iron, stainless steel, alumina, silica, silica-alumina, zirconia, beryllium oxide, potassium titanate, silicon carbide, boron carbide, titanium carbide, molybdenum carbide, tantalum carbide, boron nitride, silicon nitride, and niobium nitride.

Pyrrole and thiophene compounds can be used as the compound having conjugated double bonds to be use in the present invention. They may be used alone or in mixture. Preferred examples are pyrrole and thiophene compounds having no substituents in the 2- and 5-positions of the skeletal structure of a pyrrole or thiphene ring. Specific examples of pyrrole compounds include pyrrole, N-methylpyrrole, N-ethylpyrrole, N-n-propylpyrrole, N-n-butylpyrrole, N-phenylpyrrole, N-tolylpyrrole, N-naphthylpyrrole, 3-methylpyrrole, 3,5-dimethylpyrrole, 3-ethylpyrrole, 3-n-propylpyrrole, 3-n-butylpyrrole, 3-phenylpyrrole, 3-tolylpyrrole, 3-naphthylpyrrole, 3-methoxypyrrole, 3,5-dimethoxypyrrole, 3-ethoxypyrrole, 3-n-propyxypyrrole, 3-phenoxypyrrole, 3-methyl-N-methylpyrrole, 3-methoxy-N-methylpyrrole, 3-chloropyrrole, 3-bromopyrrole, 3-methylthiopyrrole, and 3-methylthio-N-methylpyrrole.

Specific examples of thiophene compounds include 2,2'-bithiophene, 3-methyl-2,2'-bithiophene, 3,3'-dimethyl-2,2'-bithiophene, 3,4-dimethyl-2,2'-bithiophene, 3,4-dimethyl-3',4'-dimethyl-2,2'-bithiophene, 3-methoxy-2,2'-bithiophene, 3,3'-dimethoxy-2,2'-bithiophene, 2,2',5',2''-terthiophene, 3-methyl-2,2',5',2''-thiophene, and 3,3'-dimethyl-2,2',5',2''-terthiophene.

The method of retaining the oxidizing agent on the base material may comprise the step of contacting the base material with the oxidizing agent itself or a dispersion or solution of the oxidizing agent in an adequate solvent to make the base material retain the oxidizing agent thereon. In order to facilitate retention of the oxidizing agent on the base material, the base material may be preliminarily subjected to an arbitrary treatment such as washing, degassing, rendering hydrophilic, or rendering hydrophobic. The oxidizing agent may be retained on all or a predetermined portion of the base material according to the need. For example, when the oxidizing agent is retained only on one surface of the base material, the polymer of the compound having conjugated double bonds is formed only on one surface portion to obtain an electrically conductive material having only one surface thereof made electrically conductive. As another example, when the oxidizing agent is retained in the form of a continuous line in a given direction on the base material, the polymer of the compound having conjugated double bonds is formed in the form of a continuous line only on that portion of the base material to obtain an anisotropic electrically conductive material having an electric conductivity only in a given direction. In such a way, electrical conductivity can be imparted to the base material only on an arbitrary portion only in an arbitrary direction. Thus, the electrically conductive material of the present invention can also be utilized as a material for forming an electrically conductive circuit.

Although the molar ratio of the oxidizing agent to the compound having conjugated double bonds is associated with the amount of the polymer to be formed, it is usually 0.001 to 10,000/1, preferably 0.005 to 5,000/1.

The polymer of the compound having conjugated double bonds on the base material is formed in a gas phase. Specifically, gas phase polymer formation is effected in the sole presence of a vapor of the compound having conjugated double bonds or in the conjoint presence of such a vapor with nitrogen, argon, air, other gas, or a mixture thereof. Although the whole system may be under high, ordinary, or reduced pressure, the ordinary pressure is preferred from the viewpoint of process control or the like.

The reaction temperature is not particularly limited, provided that the compound having conjugated double bonds can be polymerized at that temperature. It is usually −20° to 100° C., preferably 0° to 80° C. Although the reaction time is dependent on the reaction temperature, the amount of the oxidizing agent, the amount of the compound having conjugated double bonds, etc., it is usually 0.01 to 200 hours, preferably 0.02 to 100 hours. After polymerization, a homogeneous, dark brown to black polymer appears on a portion of the base material where the oxidizing agent is retained.

An oxidizing agent may be further retained on the formed polymer as mentioned above, and the polymerization reaction may be continued while contacting the oxidizing agent with the same or another kind of compound having conjugated double bonds, whereby an increase in the amount of the polymer formed, or formation of two or more kinds of polymers can be attained.

After completion of the polymerization reaction, the compound having conjugated double bonds and the oxidizing agent which remains on the base material are removed. They can be usually removed by immersing the base material in an alcohol or other organic solvent to effect washing. The washing in the present invention which is important for completely removing the oxidizing agent to improve the electrical conductivity is carried out, depending upon the kinds of the oxidizing agent, as set forth below: when a metallic salt containing residual group of strong acids or halogen or cyano group is used as an oxidizing agent, washing is carried out with organic solvent, and then with alcohol repeatedly; and when a peroxide or a nitrogen oxide is used as an oxidizing agent, washing is carried out with water at first to resolve the oxidizing agent and then with organic solvent and alcohol, repeatedly. By washing, a remaining amount of the oxidizing agent relative to the amount of the formed polymer must be held 1% or less, and preferably less than 0.5%, otherwise an electrically conductive material having high electrical conductivity for a practical application is not obtained. Thereafter, the base material may be dried by a conventional drying method to obtain an electrically conductive material.

In the present invention, a water content of the obtained electrically conductive material is less than 1.0% and, preferably, less than 0.5%.

As the above-mentioned base material, there may be used a material having spaces capable of retaining the oxidizing agent in the above-mentioned way and showing hydrophobicity at least on one surface thereof. When the oxidizing agent is to be retained, for example, only on one surface of a base material having no such hydrophobicity for forming an electrically conductive polymer layer only on one surface of the base material, the oxidizing agent may permeate up to the other surface of the base material because the above-mentioned base material is liable to allow the oxidizing agent to permeate into all the spaces and be retained there. Thus, an electrically conductive polymer may be formed in every portion of the base material by the gas-phase polymerization. In view of this, great care must be taken in forming an electrically conductive polymer only on one surface of the base material. This may entail a very complicated procedure in manufacturing.

When the above-mentioned hydrophobic base material is used, an electrically conductive polymer layer can be easily provided on either one of the surfaces of an electrically conductive polymer film. This provides an advantage in industrial manufacturing, whereby the industrial application of the electrically conductive polymer film can be expected to further spread in the fields of a planar heating element, a laminated functional material for photoelectric conversion, a collector, a separator-integrated electrode material, a collector-integrated electrode material, and the like.

The above-mentioned hydrophobicity is 90° C. or more in terms of contact angle with water. In this case, the oxidizing agent is used in the form of an aqueous solution, so that retention of the oxidizing agent on either one of the surfaces of the base material can be readily materialized. This can be easily understood from the fact that, when a solvent capable of permeating into the base material, such as methanol, ethanol, acetonitrile, or tetrahydrofuran, is used as the solvent of the oxidizing agent, a difficulty is encountered in retaining the oxidizing agent only on either one of the surfaces of the base material because the oxidizing agent readily permeates into or up to the hydrophobic surface even if one surface of the base material is hydrophobic. Where the sheet base material has, for example, one hydrophobic surface and the other hydrophilic surface, the oxidizing agent can be easily retained on the hydrophilic surface by immersing the base material in an aqueous solution of the oxidizing agent, or coating the hydrophilic surface with an aqueous solution of the oxidizing agent. Where the sheet base material is hydrophobic on both of the surfaces, retention of the oxidizing agent on one surface of the base material can be materialized by repeatedly coating the one surface with an aqueous solution of the oxidizing agent, or by treating the one surface with a hydrophilicity-imparting agent such as polyethylene oxide or polyvinyl alcohol and subsequently immersing the base material in an aqueous solution of the oxidizing agent or coating the hydrophilicity-imparted surface with the oxidizing agent. Where the sheet base material is hydrophilic on both of the surfaces, one surface is treated with, for example, a silicone or fluorocarbon water repellant to make the surface hydrophobic, followed by immersion in an aqueous solution of the oxidizing agent or coating of the hydrophilic surface with an aqueous solution of the oxidizing agent, whereby retention of the oxidizing agent on the hydrophilic surface can be materialized.

The secondary battery of the present invention, which can attain the aforementioned objects, is prepared by using as at least one electrode of the anode and cathode thereof a film of an electrically conductive material of the kind as discussed above, which is prepared by polymerizing in the presence of an oxidizing agent a compound having conjugated double bonds on a base film material having spaces capable of retaining the oxidizing agent in a gas phase to form a polymer of the compound having conjugated double bonds in the above-mentioned spaces. Such an electrically conductive film material preferably contains no substantial water just like the above-mentioned electrically conductive material.

Where such an electrically conductive film material is used as an electrode of a secondary battery, an electrode which can be easily produced at a relatively low cost and which has a uniform thickness even when the thickness thereof is large can be materialized.

When a highly conductive inorganic base material (in the form of plate, gauze, or the like) made of a metal such as gold, platinum, stainless steel or steel, or a carbonaceous material such as active carbon, carbon black or graphite is used as the base material which is designed also to serve as the collector, the contact of the polymer of the compound having conjugated double bonds as the electrode material with the base material as the collector can be remarkably increased. This leads to an improvement in the cycling life span of the battery. When a porous film like a polyethylene film is used as the base material, the liquid containing capacity (electrolyte containing capacity) of the electrode itself can be remarkably improved, thus providing advantages such as an improvement in the charging and discharging efficiency.

The use of the base material also as the separator or the collector as described above allows the battery assembling process to be greatly simplified, since the steps of battery assembling including those of separately preparing a separator or a collector in the battery assembling, and disposing it between two electrodes in close contact therebetween or between an electrode and a battery case in close contact therebetween can be dispensed with.

In the secondary battery of the present invention, there is an embodiment wherein electrodes made of the above-mentioned electrically conductive material are used as the anode and cathode, and an embodiment wherein an electrode made of the above-mentioned electrically conductive material is used as one of the two electrodes while the other electrode uses an electrode material selected from among metals, metallic oxides, other inorganic compounds, known electrically conductive polymers and organic compounds other than the reaction product used in the present invention, and organometallic compounds. As an example, in the embodiment wherein the above-mentioned electrically conductive material is used only in the anode while a metal is used as the electrode material of the cathode, the metal constituting the cathode has preferably an electronegativity of 1.6 or less. Examples of metals having such an electronegativity include Li, Na, K, Mg, Al, and alloys thereof. Particularly preferred are Li and its alloys.

Where the present invention is applied in a secondary battery of a non-aqueous electrolyte type, a solution of an electrolyte in an organic solvent is used as the electrolytic solution. Examples of such an electrolyte include cations of metals having an electronegativity of 1.6 or less, organic cations, and salts thereof with anions. Examples of onium ions include quaternary ammonium ions, carbonium ions, and oxonium ions. Examples of anions include $BF_4^-$, $ClO_4^-$, $PF_6^-$, $AsF_6^-$, $CF_3SO_3^-$, $I^-$, $Br^-$, $Cl^-$, and $F^-$. Specific examples of the electrolyte include lithium tetrafluoroborate ($LiBF_4$), lithium perchlorate ($LiClO_4$), lithium hexafluorophosphate ($LiPF_6$), lithium tetrachloroaluminate ($LiAlCl_4$), tetraethylammonium tetrafluoroborate $[(C_2H_5)_4NBF_4]$ tetraethylammonium perchlorate $[(C_2H_5)_4NClO_4]$, lithium trifluoromethanesulfonate ($LiCF_3SO_3$), lithium iodide (LiI), and lithium bromide (LiBr), to which the electrolyte is, however, not limited. When, for example, a battery, wherein the electrically conductive material according to the present invention is used in the anode and the cathode while an electrolytic solution of $LiBF_4$ as the electrolyte dissolved therein is used, is in the process of being charged, the electrically conductive material in the anode is doped with $BF_4^-$ in the electrolytic solution, while that in the cathode is doped with $Li^+$ in the electrolytic solution. In contrast, when the battery is in the process of being discharged, $BF_4^-$ and $Li^+$ doped in the anode and the cathode, respectively, are released into the electrolytic solution.

An organic aprotic solvent having a high dielectric constant is preferably used as the solvent for dissolving therein the electrolyte. Such an organic solvent includes nitriles, carbonates, ethers, nitro compounds, amides, sulfur containing compounds, chlorinated hydrocarbons, ketones, esters, and so on. They may be used alone or in mixture. Representative examples of such an organic solvent include acetonitrile, propionitrile, butyronitrile, benzonitrile, propylene carbonate, ethylene carbonate, tetrahydrofuran, dioxolane, 1,4-dioxane, nitromethane, N-N-dimethylformamide, dimethyl sulfoxide, sulfolane, 1,2-dichloroethane, $\gamma$-butyrolactone, 1,2-dimethoxyethane, methyl phosphate, and ethyl phosphate, to which the solvent is, however, not limited.

The concentration of the electrolytic solution used in the present invention is usually 0.001 to 10 mol/l, preferably 0.1 to 3 mol/l.

The electrolytic solution may be used either by pouring it or by incorporating it into an electrode using the electrically conductive material according to the present invention.

In the present invention, a solid electrolyte may be used instead of the above-mentioned electrolytic solution of the electrolyte. Examples of such a solid electrolyte include electrically conductive solid electrolytes based on lithium, such as LiI, $LiI-Al_2O_3$, $Li_3N$, and LiSICON; glasses of a lithium ion conduction type, such as $Li_2S-P_2S_5-LiI$; electric conductors of a lithium ion conduction type having a structure of a $\gamma_{II}-Li_3PO_4$ type, such as $Li_4SiO_4-Li_3PO_4$; polyelectrolytes of a lithium ion conduction type, such as polyethylene oxide-$LiClO_4$, and their mixtures with an additive.

Although the foregoing description has been given for the method of forming an electrode without any doping treatment of an electrically conductive material, the electrically conductive material may be preliminarily doped with a dopant before use thereof as an electrode.

In the present invention, electrodes may be covered with drainboard-like or porous glass, Teflon, polyethylene, plate, or the like in order to fix the electrodes in an electrolyte.

In the battery of the present invention, a filter paper of a glass fiber, or a porous film of Teflon, polyethylene, polypropylene, or nylon may be used as the separator.

Further, as at least one of the anode and the cathode, there may be used an electrically conductive material having an electric conductivity on one surface thereof according to the present invention, which is prepared by treating with an oxidizing agent a base material having spaces capable of retaining the oxidizing agent and having only one hydrophobic surface to allow the oxidizing agent to be retained only on the one surface, and polymerizing a compound having conjugated double bonds on the base material in a gas phase to form a polymer of the above-mentioned compound only on the one surface of the base material.

Where an electrically conductive material comprising an inorganic base material is used with the base material also serving as the collector, a metallic foam having a porosity of 70 to 98% and containing an electrically conductive polymer formed in the cell spaces of the foam may be used as the base material.

The use of an electrode made of the metallic foam containing the electrically conductive polymer formed in the cell spaces of the foam by gas-phase polymerization as mentioned above is advantageous in that the electrode has a uniform thickness easily attained due to large polymer retentivity in cell spaces of the foam even when the amount of the formed polymer is increased in order to increase the capacity. Furthermore, since the polymer is formed and retained up to the inside of the micropores of the foam, the polymer in the electrode never peels or scales off from the metallic foam as the base material by mechanical shock or the like. Thus, the mechanical strength of the electrode is remarkably improved as compared with that of an electrode prepared by press-bonding to a collector a polymer film formed by the conventional electrolytic polymerization and peeled off from an electrolytic electrode.

Usable materials of the above-mentioned metallic foam include gold, platinum, silver, copper, nickel, stainless steel, nickel-aluminum alloys, nickel-chromium alloys, copper-nickel alloys, and nickel-chromium-aluminum alloys. When the above-mentioned electrically conductive material comprising the metallic foam with a porosity of 70 to 90% as the base material is used as a collector-integrated type electrode, the bond of the electrically conductive polymer to the collector is improved, leading to a prolonged cycling life span of the resulting battery. Moreover, since the metallic foam as the base material of the electrode is porous, the liquid containing capacity of the electrode itself is improved, contributing to betterment in the charging and discharging efficiency of the electrode.

The reasons why the porosity of the metallic foam is set within a range of 70 to 98% as mentioned above are as follows. When the porosity is less than 70%, the specific area of the metallic foam (the ratio of the surface area to the volume in the metallic foam) is too small, with the result that the area of the metallic foam in contact with the electrically conductive polymer is small while the liquid-containing capacity is also low, thus decreasing the utilization of the electrically conductive polymer. On the other hand, when the porosity exceeds 98%, the necessary strength of the electrode cannot be secured. In contrast, when the porosity of the metallic foam is in the range of 70 to 98%, a secondary battery having good properties can be obtained without involving the above-mentioned problems.

Furthermore, when the porosity of the metallic foam is in the range of 70 to 98%, the ratio of the area to the volume in the metallic foam as the base material (specific surface area) is large, with the result that the amount of the polymer in the electrode in direct contact with the electrolytic solution is not decreased so much even when the amount of the formed polymer is increased in order to increase the capacity of the electrode. Therefore, even under severe charging and discharging conditions, the utilization of the electrically conductive polymer does not decrease so much. Thus, even under such conditions, high charging and discharging efficiency can be secured while a prolonged cycling life span can be obtained.

DETAILED DESCRIPTION OF PREFERRED EMBODIMENTS

Examples 1 to 3

Figure 1:
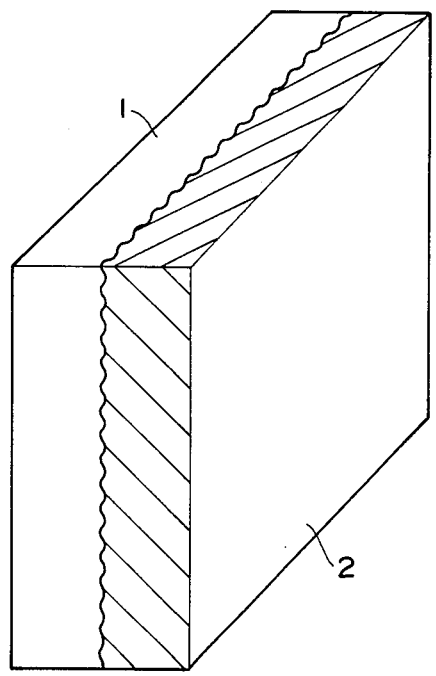
FIG. 1 is a diagram showing the structure of an electrically conductive material formed in Example 32 according to the present invention.

A porous polyethylene film having a pore size of 0.1 to 10 $\mu$m, a thickness of 20 $\mu$m, a water content of 0.04%, a length of 10 cm, and a width of 20 cm was immersed in a saturated solution of $FeCl_3.6H_2O$-methanol at room temeprature for 30 min, dried in air, and rid of droplets of the solution of $FeCl_3.6H_2O$-methanol partially remaining on the surface of the film by making them absorbed with a uniformly retained on the film. Subsequently, 4 ml of pyrrole was placed in the bottom of a glass container (length: 10 cm, width: 25 cm, height: 15 cm), and the porous film treated as described above was suspended from the upper portion of the glass container, followed by tightly covering the upper portion of the container with a glass plate, whereby the film was contacted with a pyrrole vapor.

The porous film rapidly discolored from yellow through dark green to black, and polypyrrole was formed on the porous film. The film was picked up after a predetermined contact time as listed in Table 1, and then immersed in methanol for 30 min to remove unreacted pyrrole and the $FeCl_3$ component by extraction. This procedure was repeated three times, followed by drying in air. A flexible black film was obtained. The black film contained iron in the amount of 0.02% relative to polypyrrole, and water in the amount of 0.5% relative to polypyrrole. In those examples 1 to 3 and the other examples, a contact of the oxidizing agent relative to the electrically conductive polymer was less than 0.1% (measurements of metal in case of metal salt; and nitrogen in case of ammonium salt and nitrogen oxide), and a water content was less than 0.6%.

The thickness and electric conductivity of the film were examined. The results are shown in Table 1.

TABLE 1

| Ex. No. | Contact time (hr) | Film thickness ($\mu$m) | Electric conductivity (Scm$^{-1}$) |
| --- | --- | --- | --- |
| 1 | 0.5 | 22 | $2.8 \times 10^{-1}$ |
| 2 | 2.0 | 24 | $5.2 \times 10^{-1}$ |
| 3 | 21.0 | 42 | $2.6 \times 10^{-1}$ |

The electric conductivity was measured by the four-terminal point method.

Comparative Example 1

The polymerization reaction of pyrrole on a porous film was effected in substantially the same manner as in Example 1 except that an aqueous saturated solution of $FeCl_3.6H_2O$-0.01M hydrochloric acid was used as the oxidizing agent instead of the saturated solution of $FeCl_3.6H_2O$-methanol. The porous film discolored to grayish white. The resulting film had a thickness of 20 $\mu$m, and an electric conductivity as low as $10^{-10}$ Scm$^{-1}$ or lower.

Comparative Example 2

Substantially the same procedure as in Example 1 was repeated except that the step of immersing the film in methanol for 30 min to remove the unreacted pyrrole and the $FeCl_3$ component by extraction was dispensed with, thus obtaining a film having a thickness of 23 μm and an electric conductivity of $5 \times 10^{-5}$ Scm$^{-1}$, which was as low as about 1/5,600 of that in Example 1.

Example 4

Substantially the same procedure as in Example 3 was repeated except that use was made of a porous polypropylene film "Duragard 2400" (water content: 0.08%) having a maximum pore size of 0.02×0.2 μm and a thickness of 25 μm, thus obtaining a lustrous black film having a thickness of 29 μm and an electric conductivity of $4.0 \times 10^{-3}$ Scm$^{-1}$.

Example 5

Substantially the same procedure as in Example 1 was repeated except that use was made of a porous polyimide film having an average pore size of 0.1 μm and a thickness of 10 μm and having a smooth reverse surface, thus obtaining a black film having a luster only on the obverse surface. The film had a thickness of 11 μm and an electric conductivity in the black portion of $2.1 \times 10^{-2}$ Scm$^{-1}$. The reverse surface remained yellow, and had an electric conductivity of $10^{-10}$ Scm$^{-1}$ or lower.

Thus, the obtained film was an electrically conductive film having only the obverse surface made electrically conductive.

Example 6

Substantially the same procedure as in Example 2 was repeated except that use was made of a nonwoven polypropylene fabric having a thickness of 220 μm and an areal weight of 75 g/m$^2$, thus obtaining a black film having a thickness of 230 μm and an electric conductivity of $3.5 \times 10^{-1}$ Scm$^{-1}$.

Example 7

40 straight lines having a width of 2 mm were drawn on a surface of a porous polyethylene film having a pore size of 0.1 to 10 μm, a thickness of 80 μm, a length of 10 cm, a width of 20 cm in the longitudinal direction thereof with a saturated solution of $FeCl_3.6H_2O$-methanol, followed by drying in air. The film was then placed in an atmosphere of pyrrole vapor in the same manner as in Example 1. As a result, a film having 40 black straight lines of 2 mm in width in the longitudinal direction thereof was obtained. The film showed an electric conductivity of $2.6 \times 10^{-1}$ Scm$^{-1}$ in the longitudinal direction thereof and an electric insulation in the lateral direction.

Thus, the obtained film was an electrically conductive film having an electric conductivity only in the longitudinal direction thereof.

Example 8

Substantially the same procedure as in Example 1 was repeated except that 3-methylpyrrole was used instead of pyrrole while $MoCl_5$ was used instead of $FeCl_3.6H_2O$, thus obtaining a black film having a thickness of 22 μm and an electric conductivity of $2.0 \times 10^{-1}$ Scm$^{-1}$.

Examples 9 to 15

Various pyrrole compounds were respectively contacted with various porous films as listed in Table 2 in gas phases in the presence of various oxidizing agents as listed in Table 2 for 24 hours to effect polymerization. The results are shown in Table 2.

TABLE 2

| Ex. No. | Pyrrole compound | Porous film | Film thickness (μm)/ average pore size (μm) | Oxidizing agent | Electric conductivity (Scm$^{-1}$) |
|---|---|---|---|---|---|
| 9 | N-CH$_3$ pyrrole | polyvinyl chloride | 20/1 | $K_3(Fe(CN)_6)$ | $4.8 \times 10^{-3}$ |
| 10 | 3-OCH$_3$ pyrrole (N-H) | polytetrafluoroethylene | 15/2 | $RuCl_3$ | $3.6 \times 10^{-3}$ |
| 11 | 3-SCH$_3$ pyrrole (N-H) | polyethylene | 45/5 | $(NH_4)S_2O_8$ | $1.1 \times 10^{-2}$ |

TABLE 2-continued

| Ex. No. | Pyrrole compound | Porous film | Film thickness (μm)/ average pore size (μm) | Oxidizing agent | Electric conductivity (Scm$^{-1}$) |
|---|---|---|---|---|---|
| 12 | 3-C$_6$H$_5$ pyrrole (N-H) | polyethylene terephthalate | 70/3 | FeCl$_3$ | 7.6 × 10$^{-3}$ |
| 13 | 3,4-diCH$_3$ pyrrole (N-H) | polyacrylonitrile | 20/5 | MoCl$_5$ | 6.6 × 10$^{-2}$ |
| 14 | 3-OCH$_3$, N-CH$_3$ pyrrole | polycarbonate | 10/1 | Na$_2$S$_2$O$_8$ | 3.0 × 10$^{-3}$ |
| 15 | N-C$_6$H$_5$ pyrrole | polyethylene | 150/10 | FeCl$_3$ | 7.2 × 10$^{-2}$ |

Example 16 to 22

Substantially the same procedure as in Example 1 was repeated except that each one of various non-woven fabrics as listed in Table 3 was used, thus obtaining results as shown in Table 3.

TABLE 3

| Ex. No. | Material of non-woven fabric | Film thickness (μm) | Areal weight (g/m$^2$) | Oxidizing agent | Electric conductivity (Scm$^{-1}$) |
|---|---|---|---|---|---|
| 16 | polypropylene | 220 | 75 | Fe(ClO$_4$)$_3$ | 9.0 × 10$^{-1}$ |
| 17 | polypropylene-nylon blend | 220 | 83 | CuCl$_2$ | 1.3 × 10$^{-1}$ |
| 18 | nylon | 220 | 87 | Cu(BF$_4$)$_2$ | 8.8 × 10$^{-1}$ |
| 19 | polyethylene terephthalate | 70 | 23 | Fe(BF$_4$)$_5$ | 7.3 × 10$^{-1}$ |
| 20 | aromatic polyamide | 65 | 27 | WCl$_6$ | 5.2 × 10$^{-2}$ |

Example 21 to 27

Substantially the same procedure as in Example 1 was repeated except that each one of various woven or non-woven fabrics as listed in Table 4 was used, thus obtaining results as shown in Table 4.

TABLE 4

| Ex. No. | Material | Film thickness (mm) | Areal weight (g/m$^2$) | Oxidizing agent | Electric conductivity (Scm$^{-1}$) |
|---|---|---|---|---|---|
| 21 | carbon paper | 0.2 | 50 | Cu(ClO$_4$)$_2$ | 1.3 × 10$^{-1}$ |
| 22 | carbon cloth | 0.5 | 135 | Fe(ClO$_4$)$_3$ | 9.7 × 10$^{-1}$ |
| 23 | carbon felt | 1.0 | 85 | Fe(BF$_4$)$_3$ | 6.5 × 10$^{-1}$ |
| 24 | carbon filament yarn | single yarn of 2 deniers | 1.5 (g/m) | CuCl$_2$ | 2.8 × 10$^{-2}$ |
| 25 | woven fabric of alumina | fiber diameter 17 μm | density 3.3 g/cm$^3$ | NOBF$_4$ | 3.6 × 10$^{-4}$ |
| 26 | woven fabric of silicon carbide | 15 | 2.6 | (NH$_4$)$_2$S$_2$O$_8$ | 4.4 × 10$^{-4}$ |
| 27 | woven fabric of potassium titanate | 1.0 | 3.3 | MoCl$_5$ | 5.2 × 10$^{-4}$ |

Example 28

The variation in electric conductivity of the electrically conductive film obtained in Example 2 with time was examined to obtain results as shown in Table 5.

TABLE 5

| Number of days | Electric conductivity ($Scm^{-1}$) | |
|---|---|---|
| | In air (25° C., rel. humidity: 60%) | In dry box (25° C.) |
| 0 | $5.2 \times 10^{-1}$ | $5.2 \times 10^{-1}$ |
| 4 | $3.3 \times 10^{-1}$ | $3.1 \times 10^{-1}$ |
| 12 | $1.0 \times 10^{-1}$ | $2.1 \times 10^{-1}$ |
| 17 | $1.6 \times 10^{-1}$ | $1.6 \times 10^{-1}$ |
| 25 | $1.6 \times 10^{-1}$ | $1.9 \times 10^{-1}$ |

The above-mentioned results demonstrate that the variation in electric conductivity of the electrically conductive film obtained according to the present invention was very slight.

Examples 29 to 31

One surface of a porous polyethylene film having a hydrophobicity on both of the surfaces thereof and having a power size of 0.1 to 10 μm, a thickness of 20 μm, a length of 10 cm, and a width of 20 cm was coated with an aqueous saturated solution of $Fe(ClO_4)_3 \cdot 8H_2O$ three times. Thus, the $Fe(ClO_4)_3 \cdot 8H_2O$ component was uniformly retained on the one surface of the film. Subsequently, 4 ml of pyrrole was placed in the bottom of a glass container (length: 10 cm, width: 25 cm, height: 15 cm), and the porous film treated as described above was suspended from the upper portion of the glass container, followed by tightly covering the upper portion of the container with a glass plate, whereby the film was contacted with a pyrrole vapor.

Upon contact with the pyrrole vapor, the porous film rapidly discolored from yellow through dark green to black, and polypyrrole was formed on the one surface of the porous film. The film was picked up after a predetermined contact time as listed in Table 6, and then immersed in methanol for 30 min to remove unreacted pyrrole and the $Fe(ClO_4)_3$ component by extraction. This procedure was repeated three times, followed by drying in air. A flexible black film was obtained.

The thickness of the film was examined, while the electric conductivity in the horizontal direction of the one surface of the film were measured by placing an electrode on the one surface of the film. The results are shown in Table 6.

TABLE 6

| Ex. No. | Contact time (hr) | Film thickness (μm) | Electric conductivity ($Scm^{-1}$) |
|---|---|---|---|
| 29 | 0.5 | 22 | $3.0 \times 10^{-1}$ |
| 30 | 2.0 | 23 | $4.5 \times 10^{-1}$ |
| 31 | 24.0 | 38 | $3.2 \times 10^{-1}$ |

The electric conductivity was measured by the four-terminal method.

The electric conductivity in the vertical direction of the film was measured by placing an electrode on the one surface and the other surface of the film. When the electrode was placed on either surface of the film, the electric conductivity was $10^{-10}$ $Scm^{-1}$ or lower. Thus, it was confirmed that impartation of electric conductivity was effected only on the one surface of the film.

Example 32

An aqueous solution containing polyfluoroethylene-propylene dispersed therein was sprayed over the upper surface of a non-woven nylon fabric having a thickness of 0.5 mm, a length of 10 cm, and a width of 20 cm by means of a spray, followed by drying at a temperature of 60° C. under reduced pressure for several hours. Thus, a polyfluoroethylene-propylene layer (hydrophobic layer) was formed on the upper surface of the non-woven fabric. The non-woven nylon fabric treated as described above was contacted with a pyrrole vapor in the same manner as in Example 29. Upon contact with the pyrrole vapor, a portion of the non-woven fabric having no polyfluoroethylene-propylene layer rapidly discolored from yellow through dark green to black, and polypyrrole was formed on the above-mentioned portion. After the contact with the pyrrole vapor was continued for two hours, the non-woven fabric was picked up and then immersed in methanol for 30 min to remove unreacted pyrrole and the $Fe(ClO_4)_3$ component by extraction. This procedure of removal by extraction was repeated three times, followed by drying in air. A flexible non-woven fabric comprising a black electrically conductive layer 2 (polypyrrole layer) on the lower surface thereof and a hydrophobic polyfluoroethylene-propylene layer 1 on the upper surface thereof as shown in FIG. 1 was obtained. The electric conductivity of the electrically conductive layer 2 of the non-woven fabric on the lower layer of the non-woven fabric was $5.2 \times 10^{-1}$ $Scm^{-1}$, while that of the hydrophobic layer 1 on the upper surface of the non-woven fabric was $10^{-11}$ $Scm^{-1}$ or lower, thus confirming that impartation of electric conductivity was effected only on the lower surface of the non-woven fabric.

Example 33

Substantially the same procedure as in Example 31 was repeated except that use was made of a porous polypropylene film having a hydrophobicity on both of the surfaces thereof "Duragard 2400" having a maximum pore size of $0.02 \times 0.2$ μm and a thickness of 25 μm, thus obtaining a film having one lustrous black surface and having a thickness of 28 μm. The electric conductivity in the horizontal direction of the obtained film was $6.5 \times 10^{-2}$ $Scm^{-1}$, while that in the vertical direction was $10^{-10}$ $Scm^{-1}$ or lower, thus providing that impartation of electric conductivity was effected only on one surface of the film.

Example 34

A non-woven polypropylene fabric having surfaces rendered hydrophilic by a treatment with a surface-active agent and having a thickness of 220 μm and an areal weight of 75 g/m$^2$ was immersed in a 30% aqueous solution of potassium hydroxide, heat-treated at a temperature of 60° C. for one hour, and sufficiently washed with water, followed by drying. Thus, the surfaces of the non-woven fabric became hydrophobic as a result of removal of a surface-active agent.

Substantially the same procedure as in Example 30 was repeated by using the non-woven fabric thus obtained to retain the $Fe(ClO_4)_3$ component on one surface of the non-woven fabric, which was then brought into contact with a pyrrole vapor to obtain a non-woven fabric colored black on the one surface thereof and having a thickness of 230 μm. The electric conductivity in the horizontal direction of the obtained non-woven fabric was $1.8 \times 10^{-1}$ Scm$^{-1}$, while that in the vertical direction was $10^{-10}$ Scm$^{-1}$ or lower, thus providing that impartation of electric conductivity was effected only on one surface of the non-woven fabric.

Comparative Example 3

Substantially the same procedure as in Example 34 was repeated except that the treatment with a 30% aqueous solution of potassium hydroxide was dispensed with. Retention of the oxidizing agent only on one surface of a non-woven fabric was impossible. Thus, upon contact with a pyrrole vapor, polypyrrole was formed on both of the surfaces of the non-woven fabric to blacken the surfaces. The electric conductivity in the horizontal direction of the obtained non-woven fabric was $1.5 \times 10^{-1}$ Scm$^{-1}$, while that in the vertical direction was $4.8 \times 10^{-2}$ Scm$^{-1}$. Thus, impartation of electric conductivity only on one surface of the non-woven fabric was impossible.

Comparative Example 4

Substantially the same procedure as in Example 29 was repeated except that a saturated solution of Fe(ClO$_4$)$_3$.8H$_2$O-methanol was used as the oxidizing agent solution instead of the aqueous saturated solution of Fe(ClO$_4$)$_3$.8H$_2$O, thus obtaining a film blackened on both of the surfaces thereof as a result of polypyrrole formation. The electric conductivity in the horizontal direction of the obtained film was $2.8 \times 10^{-1}$ Scm$^{-1}$, while that in the vertical direction was $1.8 \times 10^{-2}$ Scm$^{-1}$ or lower. Thus, impartation of electric conductivity only on one surface of the film was impossible.

Example 35

40 straight lines having a width of 2 mm were drawn on one surface of a porous polyethylene film having a hydrophobocity on both of the surfaces and having a pore size of 0.1 to 10 $\mu$m, a thickness of 80 $\mu$m, a length of 10 cm, and a width of 20 cm in the longitudinal direction thereof with an aqueous saturated solution of FeCl$_3$.6H$_2$O, followed by drying in air. The film was then placed in an atmosphere of pyrrole vapor in the same manner as in Example 29. As a result, a film having 40 black straight lines of 2 mm in width in the longitudinal direction thereof was obtained. The film showed an electric conductivity of $1.3 \times 10^{-1}$ Scm$^{-1}$ in the longitudinal direction thereof and an electric insulation in the lateral and vertical direction.

Thus, the obtained film was an electrically conductive film having an electric conductivity only in the longitudinal direction of one surface of the film.

Example 36

Substantially the same procedure as in Example 29 was repeated except that 3-methylpyrrole and a 40% aqueous solution of Cu(BF$_4$)$_2$ were used instead of pyrrole and Fe(ClO$_4$)$_3$.8H$_2$O, respectively, to obtain a film colored black on one surface thereof and having a thickness of 22 $\mu$m. The electric conductivity in the horizontal direction of the obtained film was $1.8 \times 10^{-3}$ Scm$^{-1}$, while that in the vertical direction was $10^{-10}$ Scm$^{-1}$ or lower.

Example 37 to 43

Each of various pyrrole compounds was polymerized by contacting the same with each of various oxidizing agents as listed in Table 7 allowed to be present on one surface of each of various porous films as listed in Table 7 in a gas phase for 24 hours. The results are also shown in Table 7.

TABLE 7

| Ex. No. | Pyrrole compound | Porous film | Film thickness ($\mu$m)/ average pore size ($\mu$m) | Oxidizing agent | Electric conductivity (Scm$^{-1}$) in horizontal direction | Electric conductivity (Scm$^{-1}$) in vertical direction |
|---|---|---|---|---|---|---|
| 37 | 1-methylpyrrole (N-CH$_3$) | polyvinyl chloride | 20/1 | K$_3$(Fe(CN)$_6$) | $2.5 \times 10^{-3}$ | $10^{-10}$ or less |
| 38 | 3-methoxypyrrole (OCH$_3$, N-H) | polytetra-fluoro-ethylene | 15/2 | RuCl$_3$ | $4.2 \times 10^{-3}$ | $10^{-10}$ or less |
| 39 | 3-methylthiopyrrole (SCH$_3$, N-H) | polyethylene | 45/5 | (NH$_4$)$_2$S$_2$O$_8$ | $1.8 \times 10^{-3}$ | $10^{-10}$ or less |

TABLE 7-continued

| Ex. No. | Pyrrole compound | Porous film | Film thickness (μm)/ average pore size (μm) | Oxidizing agent | Electric conductivity (Scm$^{-1}$) in horizontal direction | Electric conductivity (Scm$^{-1}$) in vertical direction |
|---|---|---|---|---|---|---|
| 40 | 3-C$_6$H$_5$ pyrrole (N-H) | polyethylene terephthalate | 70/3 | FeCl$_3$ | $6.6 \times 10^{-3}$ | $10^{-10}$ or less |
| 41 | 3,4-(CH$_3$)$_2$ pyrrole (N-H) | polyacrylonitrile | 20/5 | MoCl$_5$ | $5.0 \times 10^{-2}$ | $10^{-10}$ or less |
| 42 | 3-OCH$_3$ pyrrole (N-CH$_3$) | polycarbonate | 10/1 | Na$_2$S$_2$O$_8$ | $1.8 \times 10^{-3}$ | $10^{-10}$ or less |
| 43 | pyrrole (N-C$_6$H$_5$) | polyethylene | 150/10 | FeCl$_3$ | $6.8 \times 10^{-2}$ | $10^{-10}$ or less |

Example 44 to 48

Substantially the same procedure as in Example 29 was repeated except that each one of various non-woven fabrics as listed in Table 8 was used, thus obtaining results as listed in Table 8.

fabric was immersed in an aqueous saturated solution containing an oxidizing agent to allow the oxidizing agent to be retained on the surface not made hydrophobic.

TABLE 8

| Ex. No. | Material of non-woven fabric | Film thickness (μm) | Areal weight (g/m$^2$) | Oxidizing agent | Electric conductivity (Scm$^{-1}$) in horizontal direction | Electric conductivity (Scm$^{-1}$) in vertical direction |
|---|---|---|---|---|---|---|
| 44 | polypropylene | 220 | 75 | FeCl$_3$ | $7.5 \times 10^{-2}$ | $10^{-10}$ or less |
| 45 | polypropylene-nylon blend | 220 | 83 | CuCl$_2$ | $2.5 \times 10^{-1}$ | $10^{-10}$ or less |
| 46 | nylon | 220 | 87 | Cu(BF$_4$)$_2$ | $7.5 \times 10^{-1}$ | $10^{-10}$ or less |
| 47 | polyethylene terephthalate | 70 | 23 | Fe(BF$_4$)$_3$ | $3.2 \times 10^{-2}$ | $10^{-10}$ or less |
| 48 | aromatic polyamide | 65 | 27 | WCl$_6$ | $4.4 \times 10^{-2}$ | $10^{-10}$ or less |

In Examples 45, 46 and 48, one surface of each non-woven fabric was preliminarily spray-coated with a fluorocarbon water-repellant to make the one surface hydrophobic, and thereafter the treated non-woven

Examples 49 to 55

Substantially the same procedure as in Example 29 was repeated except that each one of various woven or non-woven fabrics as listed in Table 9 was used, thus obtaining results as listed in Table 9.

TABLE 9

| Ex. No. | Material | Film thickness (mm) | Areal weight (g/m$^2$) | Oxidizing agent | Electric conductivity (Scm$^{-1}$) in horizontal direction |
|---|---|---|---|---|---|
| 49 | carbon paper | 0.2 | 50 | Cu(ClO$_4$)$_2$ | $1.8 \times 10^{-1}$ |
| 50 | carbon cloth | 0.5 | 135 | Fe(ClO$_4$)$_3$ | $4.4 \times 10^{-1}$ |
| 51 | carbon felt | 1.0 | 85 | Fe(BF$_4$)$_3$ | $5.2 \times 10^{-1}$ |
| 52 | carbon filament yarn | single yarn of 2 deniers | 1.5 (g/m) | CuCl$_2$ | $1.0 \times 10^{-2}$ |
| 53 | woven fabric of alumina | fiber diameter 17 μm | density 3.3 g/cm$^3$ | RuCl$_3$ | $1.8 \times 10^{-2}$ |

TABLE 9-continued

| Ex. No. | Material | Film thickness (mm) | Areal weight (g/m²) | Oxidizing agent | Electric conductivity (Scm⁻¹) in horizontal direction |
|---|---|---|---|---|---|
| 54 | woven fabric of silicon carbide | 15 | 2.6 | $(NH_4)_2S_2O_8$ | $6.2 \times 10^{-4}$ |
| 55 | woven fabric of potassium titanate | 1.0 | 3.3 | $MoCl_5$ | $1.8 \times 10^{-4}$ |

In these Examples, one surface of each woven or non-woven fabric was preliminarily spray-coated with a silicone water-repellant to make the one surface hydrophobic, and thereafter the surface not made hydrophobic was coated with an oxidizing agent to make the surface retain the agent thereon.

Example 56

The variation in electric conductivity of the electrically conductive film obtained in Example 30 with time was examined to obtain results as shown in Table 10.

TABLE 10

| | Electric conductivity (Scm⁻¹) in horizontal direction | |
|---|---|---|
| Number of days | In air (25° C., rel. humidity: 60%) | In dry box (25° C.) |
| 0 | $4.5 \times 10^{-1}$ | $4.5 \times 10^{-1}$ |
| 5 | $3.8 \times 10^{-1}$ | $3.2 \times 10^{-1}$ |
| 10 | $2.6 \times 10^{-1}$ | $2.4 \times 10^{-1}$ |
| 20 | $2.5 \times 10^{-1}$ | $2.4 \times 10^{-1}$ |
| 30 | $2.5 \times 10^{-1}$ | $2.4 \times 10^{-1}$ |

The above-mentioned results demonstrate that the variation in electric conductivity of the electrically conductive film obtained according to the present invention was very slight.

Example 57

An aqueous solution containing polytetrafluoroethylene dispersed therein was sprayed over the upper surface of a foamed nickel plate having a thickness of 1.0 mm, a length of 10 cm, and a width of 20 cm by means of a spray, followed by drying at a temperature of 60° C. under reduced pressure for several hours. Thereafter, the polytetrafluoroethylene was fusion-bonded to the plate by a heat treatment in an argon atmosphere at a temperature of 375° C. for 30 min. Substantially the same procedure as in Example 29, except that the foamed nickel plate thus treated was used, was repeated to form a black portion of polypyrrole on the lower surface of the foamed nickel plate, the electric conductivity of which portion was $1.0 \times 10^{-1}$ Scm⁻¹.

Example 58

Substantially the same procedure as in Example 29 was repeated except that use was made of a foamed nickel plate (length: 10 cm, width: 20 cm) having a thickness of 1.0 mm, over the upper surface of which an aqueous solution of polyethylene oxide dispersed therein was sprayed by means of a spray, followed by drying at a temperature of 60° C. under reduced pressure for several hours. Thus a black portion of polypyrrole was formed on the upper surface of the foamed nickel plate and the electric conductivity of this portion was $1.1 \times 10^{-1}$ Scm⁻¹.

Example 59

Substantially the same procedure was in Example 29 was repeated except that use was made of a porous polyethylene film having a pore size of 0.1 to 10 μm, a thickness of 20 μm, a length of 10 cm, and a width of 20 cm, over the upper surface of which an aqueous solution of polyvinyl alcohol dispersed therein was applied with a roller, followed by drying at a temperature of 60° C. under reduced pressure for several hours. Thus a black portion of polypyrrole was formed on the lower surface of the film and the electric conductivity of this portion was $2.5 \times 10^{-1}$ Scm⁻¹. The electric conductivity of the upper surface of the film having no polypyrrole formed thereon was $10^{-11}$ Scm⁻¹ or lower.

Example 60

Substantially the same procedure as in Example 29 was repeated except that use was made of a film coated with an aqueous gel solution of polytetrafluoroethylene dispersed therein as a coating according to the doctor blade method, i.e. a method of applying to a base material a gel coating (the aqueous gel solution of the water-repellant dispersed therein in this case) placed on the surface of the blade opposite the advancing direction of the base material while passing the base material through a slit formed between the blade and another blade, as the method of forming a water-repellent layer, followed by drying. Thus polypyrrole was formed on one surface of the film and the electric conductivity of this surface was $2.8 \times 10^{-1}$ Scm⁻¹. The electric conductivity of the other surface of the film having no polypyrrole formed thereon was $10^{-11}$ Scm⁻¹ or lower.

Example 61

Substantially the same procedure as in Example 29 was repeated except that an aqueous solution of polyethylene dispersed therein was used as the aqueous solution of a water-repellant dispersed therein. Thus polypyrrole was formed on one surface of the film, and the electric conductivity of this surface was $2.8 \times 10^{-1}$ Scm⁻¹. The electric conductivity of the other surface of the film having no polypyrrole formed thereon was $10^{-11}$ Scm⁻¹ or lower.

Example 62

Substantially the same procedure as in Example 29 was repeated except that use was made of a base material having a water-repellent layer formed thereon according to a plasma polymerization method using tetrafluoroethylene as the polymerization monomer. Thus polypyrrole was formed on one surface of the film and the electric conductivity of this surface was $2.8 \times 10^{-1}$ Scm⁻¹. The electric conductivity of the other surface of the film having no polypyrrole formed thereon was $10^{-11}$ Scm$^{-1}$ or lower.

Example 63

Substantially the same procedure as in Example 31 was repeated except that 5.0 g of 2,2'-bithiophene was used instead of pyrrole to obtain a porous film having one black surface. The electric conductivity in the horizontal direction of the obtained film was $7.5 \times 10^{-5}$ Scm$^{-1}$, while that in the vertical direction was $10^{-10}$ Scm$^{-1}$ or lower.

Example 64

Substantially the same procedure as in Example 31 was repeated except that 5.0 g of 3,3'-dimethyl-2,2'-bithiophene was used instead of pyrrole to obtain a porous film having one blackish blue surface. The electric conductivity in the horizontal direction of the obtained film was $4.6 \times 10^{-4}$ Scm$^{-1}$, while that in the vertical direction was $10^{-10}$ Scm$^{-1}$ or lower.

Description will now be given for Examples of secondary batteries using any of the foregoing electrically conductive materials as an electrode thereof.

Example 65

A porous polyethylene film having a pore size of 0.1 to 10 μm, a thickness of 20 μm, a length of 10 cm, and a width of 20 cm was immersed in a saturated solution of FeCl$_3$.6H$_2$O in methanol at room temperature for 30 min, dried in air, and rid of droplets of the solution of FeCl$_3$.6H$_2$O-methanol partially remaining on the surface of the film by making them absorbed with a filter paper. Thus, the FeCl$_3$ component was uniformly retained on the porous film (in the pores of the film). Subsequently, 4 ml of pyrrole was placed in the bottom of a glass container (length: 10 cm, width: 25 cm, height: 15 cm), and the porous film treated as described above was suspended from the upper portion of the glass container, followed by tightly covering the upper portion of the container with a glass plate, whereby the film was contacted with a pyrrole vapor.

Upon contact with the pyrrole vapor, the porous film rapidly discolored from yellow through dark green to black, and polypyrrole was formed on the porous film. The film was picked up after contact with the pyrrole vapor for 40 hours, and then immersed in methanol for 30 min to remove unreacted pyrrole and the FeCl$_3$ component by extraction. This procedure was repeated three times, followed by drying in air. A flexible black film was obtained.

The thickness of this film and the amount of the formed polypyrrole were 84 μm and 1.6 mg/cm$^2$, respectively.

Figure 2A:
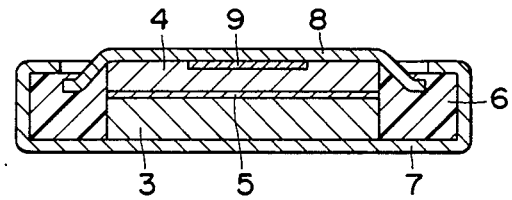
FIGS. 2 (A) and (B) are crosssectional views of secondary batteries formed in examples according to the present invention.

The resulting electrically conductive material was used as an anode material. It was punched into a predetermined size of an anode, while lithium was punched into a predetermined size of a cathode. A battery having a structure as shown in FIG. 2(A) according to the present invention (battery A of the present invention) was produced using the above-mentioned anode and cathode, a separator made of a non-woven polypropylene fabric, and an electrolytic solution containing lithium tetrafluoroborate LiBF$_4$ (electrolyte) dissolved in propylene carbonate (solvent). In this figure, the numeral 3 refers to the anode, 4 to the cathode, 5 to the separator, 6 to an insulating gasket, 7 to an anode case, 8 to a cathode case, and 9 to a cathode collector.

Figure 2B:
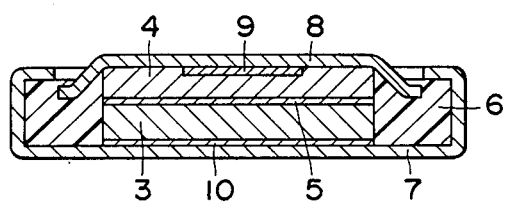

Substantially the same procedure as in the case of the battery A of the present invention was repeated except that use was made of an anode formed by punching into a predetermined size an anode material consisting of an electrically conductive material prepared by forming polypyrrole only on one surface of a thin stainless steel plate in the same manner as described above, thus producing a battery according to the present invention (battery B of the present invention) as shown in FIG. 2(B). In this figure, the numeral 10 refers to the stainless steel base material, which was bonded to the inner bottom surface of an anode case, and was also to serve as an anode collector.

Substantially the same procedure as in the case of the battery A of the present invention was repeated except that use was made of an anode formed by punching into a predetermined size an anode material consisting of a conventional polypyrrole film obtained by electrolytic oxidation polymerization which anode was press-bonded through an anode collector to the bottom surface of an anode case, thus producing a comparative battery (comparative battery C).

The above-mentioned three batteries were charged with an electric current of 0.2 mA for one hour, and subjected to a series of repeated charging and discharging cycles wherein discharging was made up to a battery voltage of 2.0 V with an electric current of 0.2 mA.

Figure 3:
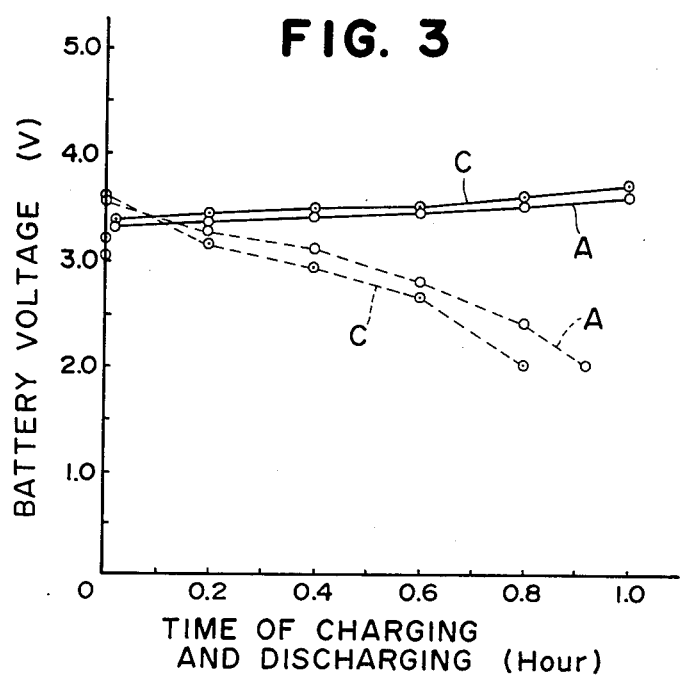
FIG. 3 is a graph showing variations in voltage of batteries according to the present invention and comparative batteries with time during the course of charging and discharging in their 60th cycle.

FIG. 3 shows variations in battery voltage of the battery A of the present invention and the comparative battery C with time in charging and discharging of the 60th cycle. In this figure, the solid lines refer to voltage variations in charging, while the dotted lines refer to those in discharging. It will be understood from FIG. 3 that the battery A of the present invention has a low charging voltage and a high discharging voltage as compared with the comparative battery C, whereby the battery A achieved an improvement in charging and discharging efficiency to that extent. The charging and discharging efficiency in this cycle of the battery A of the present invention was 92%, while that of the comparative battery was 80%. The reason for such an improvement in charging and discharging efficiency of the battery A of the present invention is believed to be that the electrically conductive material used as the anode of the battery A of the present invention comprised a porous sheet having a good liquid absorption as the base material, thus contributing to an improvement in liquid containing capacity of the anode itself to that extent.

Figure 4:
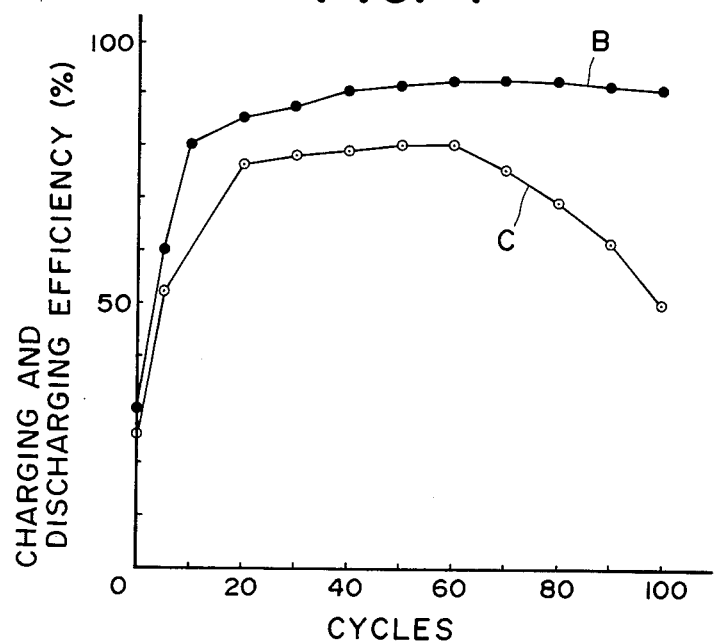
FIG. 4 is a graph showing the cycling characteristics of the batteries just mentioned above.

FIG. 4 shows variations in charging and discharging efficiency (%) of the battery B of the present invention and the comparative battery C with cycles. As is recognized in the figure, the charging and discharging efficiency of the comparative battery C began to decrease when the number of cycles exceeded about 60, and decreased to 50% in the 100th cycles. In contrast, it was found that the battery B of the present invention not only showed high charging and discharging efficiencies throughout the whole cycles as compared with the comparative battery C, but also kept a high charging and discharging efficiency of 90% even in the 100th cycle. The reason for the poor cycling characteristics of the comparative battery C is believed to be that the polypyrrole film of the anode was scaled or peeled off from the anode collector in the course of charging and discharging cycles while gradually aggravating the bond and contact therebetween. In the case of the battery B of the present invention, the reason for an improvement in cycling characteristics thereof is believed to be that, since the electrically conductive material having the stainless steel base material was used as the anode with the base material also serving as the anode collector, the bond between the polypyrrole film as the anode material and the collector was remarkably improved, with the result that there arose few changes that the polypyrrole film might be scaled or peeled off from the collector in the course of charging and discharging cycles.

Although description has been made of the batteries using the electrically conductive material only in the anode, it will be apparent that an equivalent effect may also be attained where the electrically conductive material according to the present invention is used in the cathode or in both of the anode and cathode.

Example 66

Figure 5A:
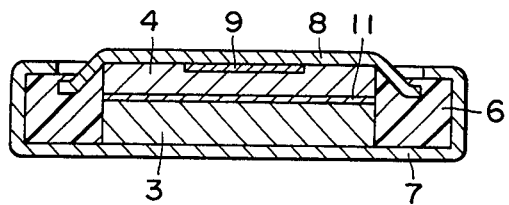
FIGS. 5 (A) and (B) are crosssectional views of batteries formed in examples according to the present invention.

The electrically conductive material as obtained in Example 29 was used as an anode material. It was punched into a predetermined size of an anode, while lithum was punched into a predetermined size of a cathode. A battery having a structure as shown in FIG. 5(A) according to the present invention (battery D of the present invention) was produced using the above-mentioned anode and cathode, and an electrolytic solution containing lithium tetrafluoroborate $LiBF_4$ (electrolyte) dissolved in propylene carbonate (solvent). In this figure, the numeral 11 refers to the porous polyethylene film, which was placed between the anode 3 and the cathode 4, and was also to serve as a separator.

Figure 5B:
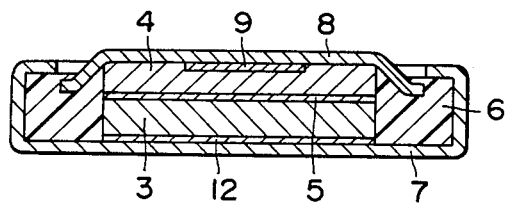

Substantially the same procedure as in the case of the battery D of the present invention was repeated except that use was made of an anode formed by punching into a predetermined size an anode material consisting of the electrically conductive material as obtained in Example 50 and a separator made of a non-woven polypropylene fabric, thus producing a battery according to the present invention (battery E of the present invention) as shown in FIG. 5(B). In this figure, the numeral 12 refers to a carbon cloth, which was bonded to the inner bottom surface of an anode case, and was also to serve as an anode collector.

Substantially the same procedure as in the case of the battery D of the present invention was repeated except that use was made of an anode formed by punching into a predetermined size an anode material consisting of a conventional polypyrrole film obtained by electrolytic oxidation polymerization which anode was press-bonded through an anode collector to the bottom surface of an anode case and that use was made of a separator made of a non-woven polypropylene fabric, thus producing a comparative battery (comparative battery F).

The above-mentioned three batteries were charged with an electric current of 0.1 mA for one hour, and subjected to a series of repeated charging and discharging cycles wherein discharging was made up to a battery voltage of 2.5 V with an electric current of 0.1 mA.

Figure 6:
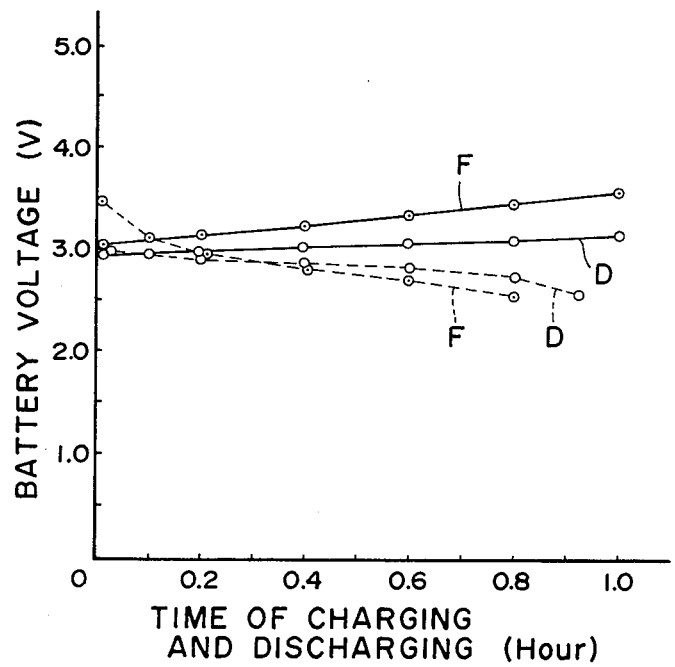
FIG. 6 is a graph showing variations in voltage of batteries according to the present invention and comparative batteries with time during the course of charging and discharging in their 60th cycle.

FIG. 6 shows variations in battery voltage of the battery D of the present invention and the comparative battery F with time in charging and discharging of the 60th cycle. In this figure, solid lines refer to voltage variations in charging, while dotted lines refer to those in discharging. It will be understood from FIG. 6 that the battery D of the present invention has a low charging voltage and a high discharging voltage as compared with the comparative battery F, whereby the battery D achieved an improvement in charging and discharging efficiency to that extent. The charging and discharging efficiency in this cycle of the battery D of the present invention was 92%, while that of the comparative battery was 80%. The reason for such an improvement in charging and discharging efficiency of the battery D of the present invention is believed to be not only that the electrically conductive material used as the anode of the battery D of the present invention comprised a porous sheet having a good liquid absorption as the base material, thus contributing to an improvement in liquid containing capacity of the anode itself, but also that the distance between the electrodes was reduced in the battery D of the present invention as compared with that in the comparative battery, so that the internal resistance was descreased to suppress the increase in charging voltage and increase the discharging voltage.

Figure 7:
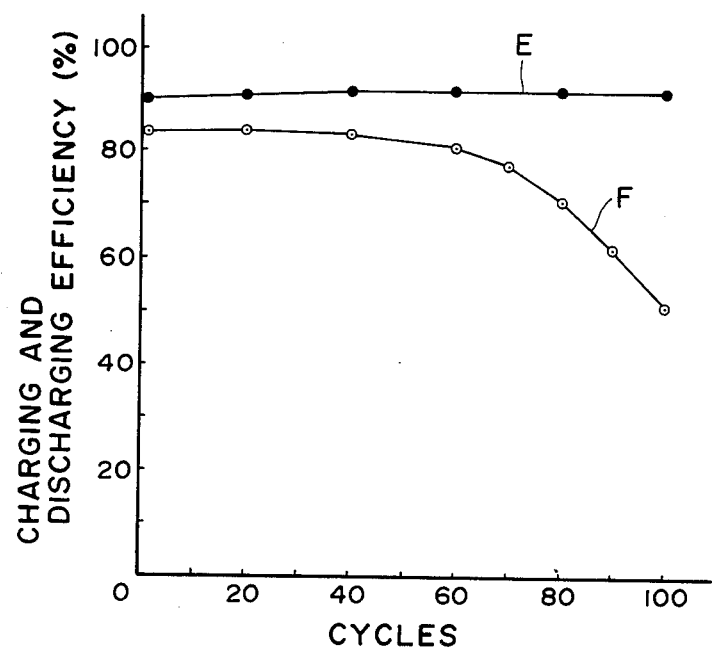
FIG. 7 is a graph showing the cycling characteristics of the battery according to the present invention and the comparative battery.

FIG. 7 shows variations in charging and discharging efficiency (%) of the battery E of the present invention and the comparative battery F with cycles. As is recognized in the figure, the charging and discharging efficiency of the comarative battery F began to decrease when the number of cycles exceeded about 60, and decreased to 50% in the 100th cycles. In contrast, it was found that the battery E of the present invention not only showed high charging and discharging efficiencies throughout the whole cycles as compared with the comparative battery F, but also kept a high charging and discharging efficiency of 90% even in the 100th cycle. The reason for the poor cycling characteristics of the comparative battery F is believed to be that the polypyrrole film of the anode was scaled or peeled off from the anode collector in the course of charging and discharging cycles while gradually aggravating the bond and contact therebetween. In the case of the battery E of the present invention, the reason for an improvement in cycling characteristics thereof is believed to be that, since the electrically conductive material having the carbon cloth base material was used as the anode with the base material also serving as the anode collector, the bond between the polypyrrole film as the anode material and the collector was remarkably improved, with the result that there arose few chances that the polypyrrole film might be scaled or peeled off from the collector in the course of charging and discharging cycles.

Although description has been made of the batteries using the electrically conductive material only in the anode, it will be apparent that an equivalent effect may also be attained where the electrically conductive material according to the present invention is used in the cathode or in both of the anode and cathode.

Example 67

One surface of a stainless steel foam having a porosity of 70% was immersed in a saturated solution of $FeCl_3.6H_2O$-methanol at room temperature for 30 min, dried in air, and rid of droplets of the solution of $FeCl_3.6H_2O$-methanol partially remaining on the surface of the foam by making them absorbed with a filter paper. Thus, the $FeCl_3$ component was uniformly retained on the one surface of the foam. Subsequently, 4 ml of pyrrole was placed in the bottom of a glass container (length: 10 cm, width: 25 cm, height: 15 cm), and the foam treated as described above was suspended from the upper portion of the glass container, followed by tightly covering the upper portion of the container with a glass plate, whereby the foam was contacted with a pyrrole vapor. Upon such contact, the one surface of the foam rapidly discolored through dark green to black, and polypyrrole was foamed on the one surface of the foam.

Figure 8:
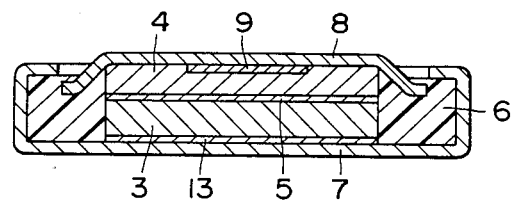
FIG. 8 is a crosssectional view of the structure of a secondary battery formed in an example according to the present invention.

The foam was picked up after contact with the pyrrole vapor for 40 hours, and then immersed in methanol for 30 min to remove unreacted pyrrole and the $FeCl_3$ component by xtraction. This procedure was repeated three times, followed by drying in air. With an anode having a predetermined size punched from the resulting foam and a cathode having a predetermined size punched from lithium, a secondary battery as shown in FIG. 8 according to the present invention (battery G of the present invention) was produced. In this figure, the metallic foam 13 was bonded to the inner bottom surface of an anode case, and was also to serve as an anode collector. In this Example, propylene carbonate was used as the solvent for an electrolyte, while lithium tetrafluoroborate ($LiBF_4$) was used as the electrolyte. A separator made of a non-woven polypropylene fabric was used. In addition to propylene carbonate, usable solvents for the electrolyte include ethylene carbonate, acetonitrile, propionitrile, butylonitrile, benzonitrile, dioxolane, 1,4-dioxane, tetrahydrofuran, 1,2-dimethoxyethane, 1,2-dichloroethane, nitromethane, N,N-dimethylformamide, dimethyl sulfoxide, sulfolane, methyl phosphate, ethyl phosphate, and $\gamma$-butylolactone. These solvents may be used alone or in mixture. In addition to lithium tetrafluoroborate ($LiBF_4$), usable electrolytes include lithium perchlorate ($LiClO_4$), lithium hexafluorophosphate ($LiPF_6$), lithium tetrachloroaluminate ($LiAlCl_4$), tetraethylammonium tetrafluoroborate [$(C_2H_5)_4NBF_4$], tetraethylammonium perchlorate [$(C_2H_5)_4NClO_4$], lithium trifluoromethanesulfonate ($LiCF_3SO_3$), lithium bromide ($LiBr$), and lithium iodide ($LiI$).

Batteries (batteries H and I of the present invention) having substantially the same structure as that of the battery G of the present invention except for the use of a stainless steel foam having a porosity of 80% or 98%, respectively, were produced.

For comparison, secondary batteries (comparative batteries J and K) having the same structure as that of the battery A of the present invention except for the use of a stainless steel foam having a porosity of 60% or 40%, respectively, were produced. Further, a comparative battery L having the same structure as that of the battery G of the present invention except that a conventional polypyrrole film prepared by the electrolytic polymerization method was press-bonded through a collector to an anode case and was used as the anode, was produced.

The above-mentioned six batteries were charged with an electric current of 0.5 mA for one hour, and subjected to a series of repeated charging and discharging cycles wherein discharging was made up to a battery voltage of 2.5 V with an electric current of 0.5 mA.

Figure 9:
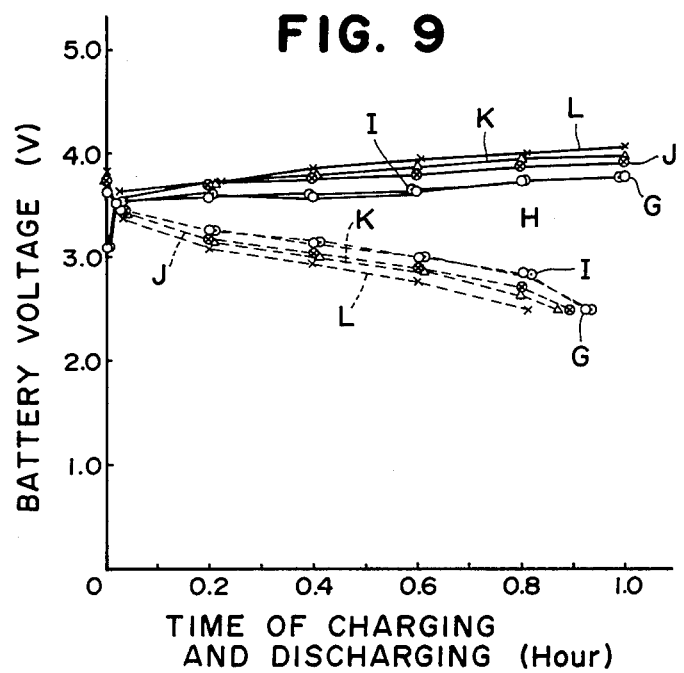
FIG. 9 is a graph showing variations in voltage of batteries according to the present invention and comparative batteries with time during the course of charging in their 20th cycle.

FIG. 9 shows variations in voltage of the batteries G to I of the present invention and the comparative batteries J to L with time in charging and discharging of the 20th cycle. In this figure, solid lines refer to voltage variations in charging, while dotted lines refer to those in discharging. It will be understood from FIG. 9 that the batteries G to I of the present invention has a low charging voltage and a high discharging voltage as compared with the comparative batteries J to L, and has a good charging and discharging efficiency. The charging and discharging efficiencies of the batteries G to I of the present invention were 92%, 93%, and 93%, respectively, while those of the comparative batteries were 89%, 87%, and 81%, respectively. The reason for such an impprovement in charging and discharging efficiencies of the batteries G to I of the present invention is believed to be that, in the batteries G to I of the present invention, a stainless steel foam having a high porosity of 70 to 98% and hence a very good liquid containing capacity was used as the electrode base material, so that the area of the stainless steel foam in contact with the electrically conductive material was large, thus increasing the area of the direct contact between the electrically conductive polymer and the electrolytic solution to improve the utilization of the polymer. On the other hand, since the comparative batteries J and K used a stainless steel foam as the electrode base material, they had a good liquid containing capacity as compared with the comparative battery L and hence a high utilization of the electrically conductive polymer, whereby the charging and discharging efficiencies thereof were increased. Since, however, the porosities of the steinless steel foams used in the comparative batteries J and K were as low as 60% and 40%, respectively, the specific areas of the anodes were small to that extent, and hence the liquid containing capacities of the anodes were low. Thus, the areas of the stainless steel foam in contact with the polypyrrole were reduced with the amounts of the polymer in this experiment, and the amounts of polypyrrole in direct contact with the electrolyte were also reduced. As a result, the utilizations of polypyrrole in these batteries were believed to be lowered, leading to the lower charging and discharging efficiencies than those of the batteries G and I of the present invention.

Figure 10:
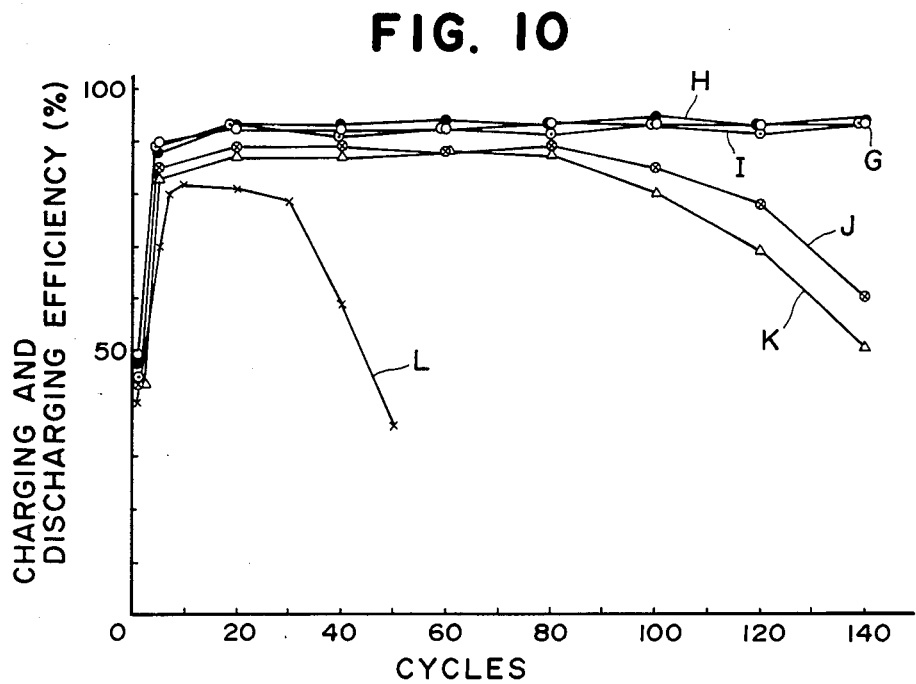
FIG. 10 is a graph showing the cycling characteristics of the batteries according to the present invention and the comparative batteries.

FIG. 10 shows variations in charging and discharging efficiency (%) of the batteries G to I of the present invention and the comparative batteries J to L with cycles As is apparent from the figure, the charging and discharging efficiencies in the 140th cycles of the batteries G to I of the present invention were as high as 93%, 94%, and 93%, respectively, thus providing a good cycling life span. In contrast, the charging and discharging efficiency of the comparative battery L began to drastically aggravate when the number of cycles exceeded about 30. The reason for the poor cycling characteristics of the comparative battery L is believed to be that the polypyrrole film of the anode was scaled or peeled off from the collector in the course of charging and discharging cycles while gradually aggravating the bond therebetween, so that electric current might begin to concentratedly flow locally in the anode, leading to marked reduction in the utilization of polypyrrole in the anode and hence to large reduction in the charging and discharging efficiency of the battery. In the case of the comparative batteries J and K, relatively high charging and discharging efficiencies thereof could be maintained. This is because the use of the stainless steel foam as both the anode and the collector provided a good bond of the polypyrrole film polymer to the stainless steel foam and a good liquid containing capacity of the anode as compared with the comparative battery L. In comparison with the batteries G to I of the present invention, the porosities of the above-mentioned stainless steel foams were by far low in the cases of the comparative batteries J and K. This is believed to provide lower utilizations of polypyrrole than those of the batteries G to I of the present invention, thus causing the initiation around over the 100th cycle of concentration of the electric current in a localized portion of the anode. This may have caused degradation of the polypyrrole itself which may have given rise to a rapid rise of the charging voltage to cause decomposition of the electrolyte, decomposition and polymerization of the solvent, etc.

On the other hand, the batteries G to I of the present invention used a stainless steel foam having a porosity ranging from 70% to 98% as both the anode base material and the collector, increasing the utilization of polypyrrole and hence providing the excellent cycling characteristics.

Figure 11:
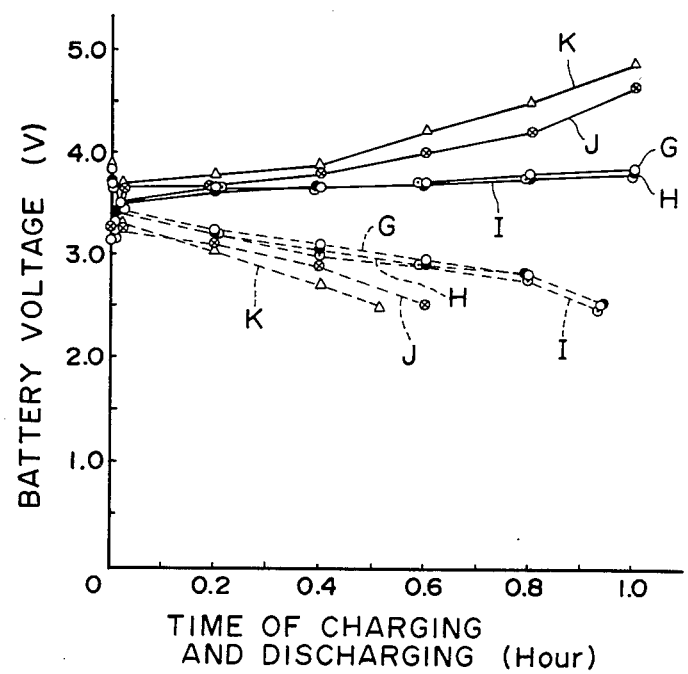
FIG. 11 is a graph showing variations in voltage of batteries according to the present invention and comparative batteries with time during the course of charging and discharging in their 140th cycle.

FIG. 11 shows variations in battery voltage of the batteries G to I of the present invention and the comparative batteries J to L with time in charging and discharging of the 140th cycle. As is apparent from the figure, the batteries G to I of the present invention showed no rise of charging voltage even in 140th cycle, and a flatter charging voltage curve than those of the comparative batteries J and K. As a result, it can be understood that the batteries G to I of the present invention maintained good cycling characteristics in a large number of cycles.

Although description has been made of the batteries using the electrically conductive material only in the anode, it will be apparent that an equivalent effect may also be attained where the electrically conductive material according to the present invention is used in the cathode or in both of the anode and cathode.

What is claimed is:

1. An electrically conductive material containing no substantial amount of water and oxidizing agent and prepared by polymerizing, in the presence of an oxidizing agent, a pyrrole or thiophene compound on a base material in a gas phase and then washing the resultant product with an organic solvent, wherein said base material has spaces capable of retaining said oxidizing agent and said electrically conductive material contains no substantial amount of said compound.

2. The electrically conductive material according to claim 1, wherein said base material has at least one hydrophobic surface.

3. The electrically conductive material according to claim 2, wherein said base material has said oxidizing agent retained on one surface thereof by immersing a base material having one hydrophobic surface and the other hydrophilic surface in an aqueous solution of said oxidizing agent, or by applying an aqueous solution of said oxidizing agent to said other surface to make said oxidizing agent retained on said other surface.

4. The electrically conductive material according to claim 3, wherein said base material is one treated with a hydrophilicity-imparting agent on one surface thereof.

5. The electrically conductive material according to claim 3, wherein said base material is a hydrophilic one treated with a water-repellant on one surface thereof.

6. The electrically conductive material according to claim 2, wherein said base material has said oxidizing agent retained on one surface thereof by applying an aqueous solution of said oxidizing agent on one surface of a base material which is hydrophobic on both of the surfaces thereof.

7. The electrically conductive material according to claim 2, wherein said base material is one treated with a hydrophilicity-imparting agent on one surface thereof.

8. The electrically conductive material according to claim 2, wherein said base material is a hydrophilic one treated with a water-repellant on one surface thereof.

9. The electrically conductive material according to claim 1, wherein said base material is made of a hydrophobic resin.

10. The electrically conductive material according to claim 9, wherein said hydrophobic resin is polyethylene, polypropylene, ethylene-propylene copolymer, polyvinyl chloride, polyvinylidene chloride, polyvinyl fluoride, polytetrafluoroethylene, polyethylene terephthalate, polybutylene terephthalate, polystyrene, polyamide, polyimide, polyamide-imide, polyvinyl alcohol, ethylene-vinyl acetate copolymer, polyacrylonitrile, polymethacrylonitrile, polymethyl methacrylate, polybutyl methacrylate, polystyrene-acrylonitrile, or polycarbonate.

11. The electrically conductive material according to claim 1, wherein said base material is inorganic one.

12. The electrically conductive material as claimed in claim 11, wherein said inorganic base material is active carbon, carbon black, graphite, chromium, titanium, nickel, gold, platinum, tantalum, copper, silver, iron, stainless steel, alumina, silica, silica-alumina, zirconia, beryllium oxide, potassium titanate, silicon carbide, boron carbide, titanium carbide, molybdenum carbide, tantalum carbide, boron nitride, silicon nitride, or niobium nitride.

13. The electrically conductive material according to claim 1, wherein said oxidizing agent is used in a state of being dispersed or dissolved in an organic solvent.

14. A secondary battery produced by using as at least one electrode of the anode and the cathode thereof, a film of an electrically conductive material containing no substantial amount of water and oxidizing agent and prepared by polymerizing, in the presence of an oxidizing agent, a pyrrole or thiophene compound on a base material having spaces capable of retaining said oxidizing agent in a gas phase, and then washing the resultant product with an organic solvent, wherein said film contains no substantial amount of said compound.

15. A secondary battery produced by using as at least one electrode of the anode and the cathode thereof, a film of an electrically conductive material prepared by treating with an oxidizing agent, a sheet of a base material having spaces capable of retaining said oxidizing agent, to retain said oxidizing agent only on one surface of said sheet, polymerizing a pyrrole or thiophene compound on said base material in a gas phase and then washing the resultant product with an organic solvent to thereby form a polymer of said compound on said one surface, wherein said film contains no substantial amount of water, said compound and said oxidizing agent.

16. A secondary battery produced by using as at least one electrode of the anode and the cathode thereof, a film of an electrically conductive material prepared by polymerizing, in the presence of an oxidizing agent, a pyrrole or thiophene compound on a metallic foam having porosity of 70 to 98% and having spaces capable of retaining said oxidizing agent in a gas phase, and then washing the resultant product with an organic solvent to thereby form a polymer of said compound in said spaces of said metallic foam.

17. A secondary battery produced by using, as at least one electrode of the anode and the cathode thereof, a film of an electrically conductive material prepared by treating with a solution of oxidizing agent in water, methanol or ethanol, a sheet of a base material having spaces capable of retaining said oxidizing agent to retain the oxidizing agentof said solution only on one surface of said sheet, polymerizing a pyrrole or thiophene compound on said base material in a gas phase and then washing the resultant product with an organic solvent to thereby form a polymer of said compound on said one surface, wherein said film contains no substantial amount of water, said compound and said oxidizing agent.

* * * * *